United States Patent [19]

Beckman

[11] Patent Number: 4,986,574
[45] Date of Patent: Jan. 22, 1991

[54] RAISED FACE FLANGE ALIGNMENT TOOL

[75] Inventor: Gary D. Beckman, Austin, Tex.

[73] Assignee: Fisher Controls International, Inc., Clayton, Mo.

[21] Appl. No.: 463,479

[22] Filed: Jan. 11, 1990

[51] Int. Cl.⁵ .............................................. F16L 35/00
[52] U.S. Cl. ........................................ 285/24; 285/363
[58] Field of Search ................ 285/340, 368, 379, 24, 285/27, 363, 405, 319, 321, 232, 108; 403/13, 14, 337

[56] References Cited

U.S. PATENT DOCUMENTS

| | | | |
|---|---|---|---|
| 1,866,160 | 7/1932 | Griswold, Jr. | 285/336 X |
| 2,859,052 | 11/1958 | Corbeels et al. | 285/363 X |
| 3,368,830 | 2/1968 | French | 285/110 |
| 3,603,616 | 9/1971 | Smith | 285/15 |
| 3,603,617 | 9/1971 | Lochridge | 285/24 |
| 4,155,571 | 5/1979 | Gastineau et al. | 285/24 |
| 4,288,105 | 9/1981 | Press | 285/24 X |
| 4,568,109 | 2/1986 | Prueter | 285/24 |
| 4,655,481 | 4/1987 | Prueter | 285/24 |
| 4,676,436 | 6/1987 | Willis | 239/265.33 |

Primary Examiner—Randolph A. Reese
Assistant Examiner—Heather Chun
Attorney, Agent, or Firm—Marshall, O'Toole, Gerstein, Murray & Bicknell

[57] ABSTRACT

An alignment tool for use with a pipeline mounting flange having a raised face flange to self center two opposing raised face flanges during a fluid pipeline mounting operation. A plate-like ring with outwardly diverging spring fingers with an inner diameter slightly larger than the outer dimaeter of the raised face flanges is mounted on the pipeline mounting flanges so the fingers are adjacent the raised face flanges. Tightening the flanges throughbolts moves the flanges together while the spring fingers engage the riased face flanges and maintain the raised face flanges in self centering alignment. A flange seal gasket is captured within the plate-like ring.

7 Claims, 2 Drawing Sheets

RAISED FACE FLANGE ALIGNMENT TOOL

This invention relates to a device in a fluid pipeline system for aligning and self centering meeting flanges, and in particular to an alignment device for aligning the raised faces of meeting flanges so that the mated pipeline components are properly connected without obstructions in the fluid flow.

BACKGROUND OF THE INVENTION

Reference may be made to the following U.S. Pat. Nos.: 3,368,830; 3,603,616; 3,603,617; 4,155,571; 4,288,105; 4,568,109; 4,655,481; 4,676,436.

Fluid pipeline systems contain components having mating flanges which must be bolted together with multiple throughbolts in order to securely lock the components in the system. The mating of such components, such as with flanges on sections of pipe, fittings, or meters is desired to be accomplished such that the centerline of the two mating components are aligned thereby preventing the fluid flow from being undesirably disturbed or disrupted at the mating junction. In the use of flow measuring instruments, for instance, it is particularly important that the flow meter centerline is aligned with the pipeline centerline to avoid creating vortices in the fluid flow which interfere with reliable flow meter readings. With the recent advent of extremely accurate flow sensing meters, the need to align and maintain proper alignment of the meter in the pipeline becomes extremely important.

Standard industry pipe flanges include a raised face providing a sealing surface matched to the raised face of an opposite flange. It is desired that the outer diameter of the respective raised faces are aligned during installation of pipeline components. The two opposing raised face flanges contain a series of holes which are aligned for placement of respective throughbolts for mounting and locking the flanges together.

However, due to industry specified tolerance in the flange bolt hole diameters, and of the diameter of the connecting throughbolts, there exists a certain amount of available movement of the mating flanges with respect to each other even with the throughbolts in position. Thus, as the mating raised face flanges are placed in position and the throughbolts are inserted, movement of one raised face flange with respect to the other while the throughbolts are being tightened makes it nearly impossible to obtain desired pipeline component alignment. In instances where pipeline alignment is necessary such as where a fluid flow measuring instrument is inserted into the pipeline system, proper alignment would at best be randomly achieved during tightening of the throughbolts.

Various alignment devices, gauges and tools have been proposed to achieve the desired alignment. One technique utilizes a pair of identical alignment gauges each having a probing finger and an engagement with the outside diameter of the raised face portion of a respective flange. As the throughbolts are tightened in position the operator must visually observe and attempt to maintain the alignment of respective edges of the gauges and thereby hopefully attain alignment of the raised face flanges.

Another technique is to utilize a pair of identical bore alignment plates in which the boltholes are smaller in diameter than the industry standard flange boltholes. Thus, the alignment plate boltholes more closely match the outer diameter of the throughbolts so as to minimize the amount of movement in the connecting flanges as the throughbolts are locked in position.

Prior attempts are time consuming and require considerable manual manipulation of the several components during mating of the opposing flanges to maintain proper alignment thereof. In addition, each is subject to human errors in attempting to maintain the proper alignment. Accordingly, such prior techniques are not reliable in instances where a very accurate flowmeter instrument is to be mounted in the system to provide accurate and reliable fluid flow measurements.

Accordingly, it is desired to provide an alignment tool having a minimum number of components and which can be reliably used without time consuming effort. In addition, it is desired to provide such an alignment tool which self centers the opposing raised face flanges and maintains the self centering alignment while the flanges are being locked into position by tightening the throughbolts.

SUMMARY OF THE INVENTION

In accordance with the principles of the present invention, there is provided a raised face flange alignment tool in the form of a plate ring which maintains the flanges in a self centering position during mounting in the pipeline. The ring includes an outer portion having boltholes matching the flange boltholes. An inner portion of the ring includes raised spring fingers for engaging the outside diameter of the oppositely disposed raised faces of the opposing flanges.

The inner diameter of the upraised spring fingers is slightly greater than the outside diameter of the raised faces on the opposing flanges. Thus, when the flanges are bolted together the spring fingers are depressingly urged towards each other and the raised faces are maintained self centering as they are moved closer together. As the flanges are moved closer together, the raised fingers are compressed and bent inwardly towards each other to reduce the inner diameter between the fingers until the fingers' inner diameter is substantially equal to the outer diameter of the raised face flanges when the flanges are in a fully tightened and mounted position. During the mounting movement the centerlines of the flanges are maintained in a self centering position.

In accordance with another aspect of the present invention, the alignment tool includes a plurality of guide fingers projecting inwardly from the ring to maintain a seal gasket aligned with the raised face flange and free from interfering with the throughbolts when the bolts are inserted into position. Proper positioning of the seal gasket prevents undesired interference with the fluid flow passage between the connecting pipeline components.

Accordingly, the present invention provides an easy to use, precise and inexpensive alignment tool which readily self centers the mating pipeline raised face flanges regardless of the standard industry tolerances and without any previously required constant measurement or constant visual operator interpretation of the alignment. Additionally, the alignment tool of the present invention also provides the proper location of a seal gasket during the mounting procedure.

BRIEF DESCRIPTION OF THE DRAWINGS

The features of this invention which are believed to be novel are set forth with particularity in the appended claims. The invention, together with its object and the advantages thereof, may be best understood by reference to the following description taken in conjunction with the accompanying drawings, in which like reference numerals identify like elements in the several figures and in which:

DETAILED DESCRIPTION

Figure 1:
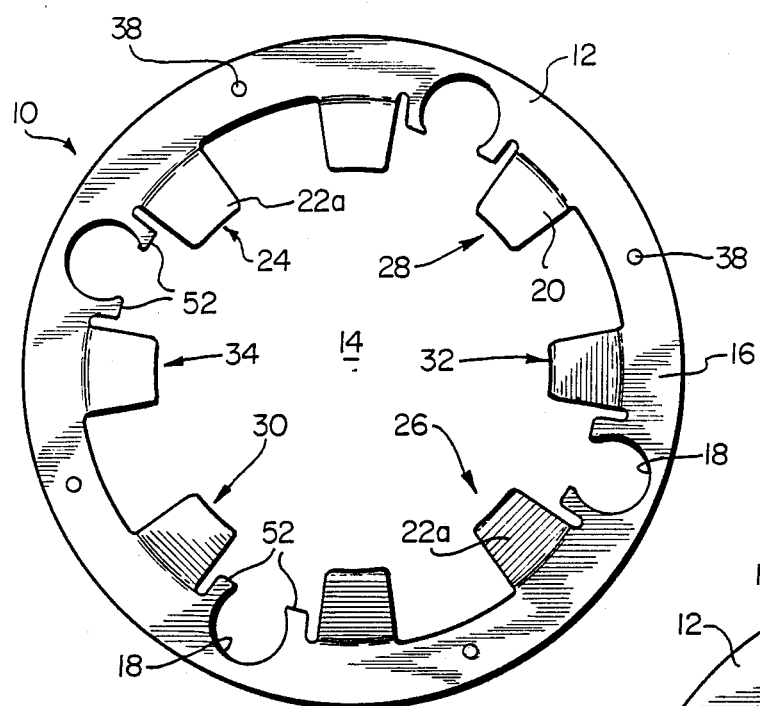
FIG. 1 is an elevational view of a plate ring component of a preferred embodiment of the raised face flange alignment tool of the present invention.

Referring now to the figures, there is illustrated an alignment tool device 10 including a plate ring 12 having a central aperture 14. Plate ring 12 includes an outer annular planar portion 16 with a plurality of flange throughbolt holes 18. Plate ring 12 further includes an inner portion 20 defining central aperture 14 and including a plurality of spring fingers 22a located at opposite positions 24, 26; 28, 30; 32, 34; etc., across the central aperture. The spring fingers are raised from the outer annular planar portion 16 of plate ring 12 and diverge outwardly from the planar surface.

Figure 3:
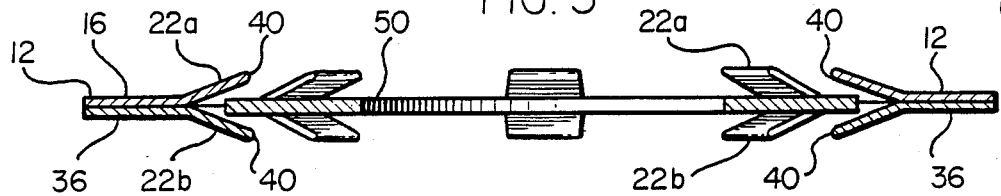
FIG. 3 is a sectional view of an assembled raised face flange alignment tool having two plate rings and a sealing gasket in accordance with the preferred embodiment of FIG. 1.

A second plate ring 36 similar in shape to plate ring 12 is attached to ring 12 by means such as spot welding 38 so that spring fingers 22b are matched with a corresponding spring finger 22a of plate ring 12 as shown in FIG. 3.

Figure 4:
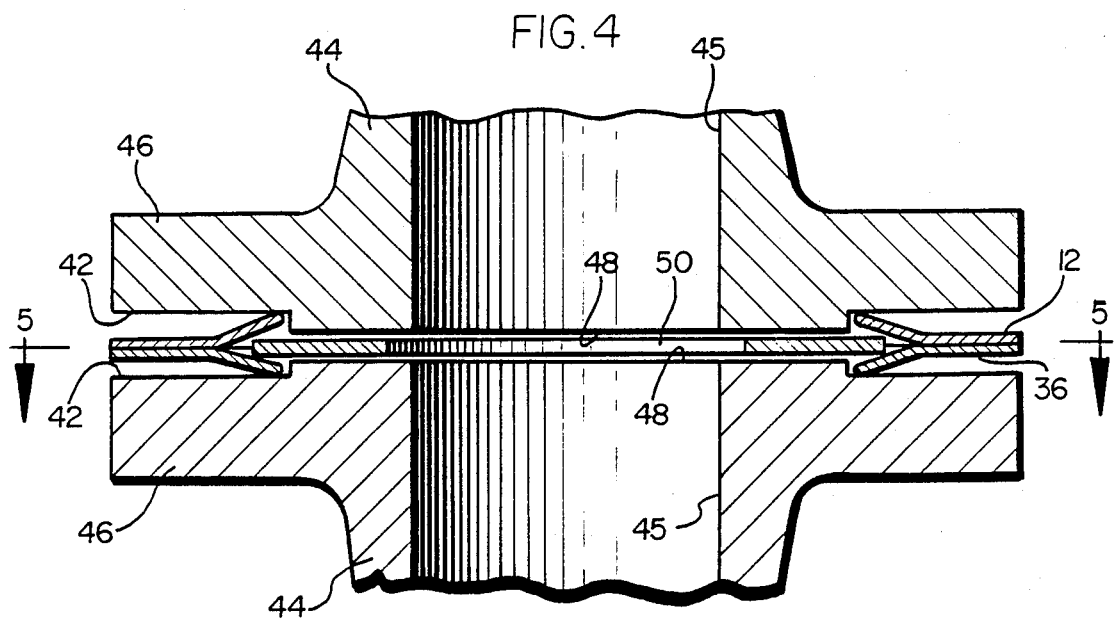
FIG. 4 is a fragmented sectional view of the alignment tool mounted on the raised face flanges in an initial position.
Figure 5:
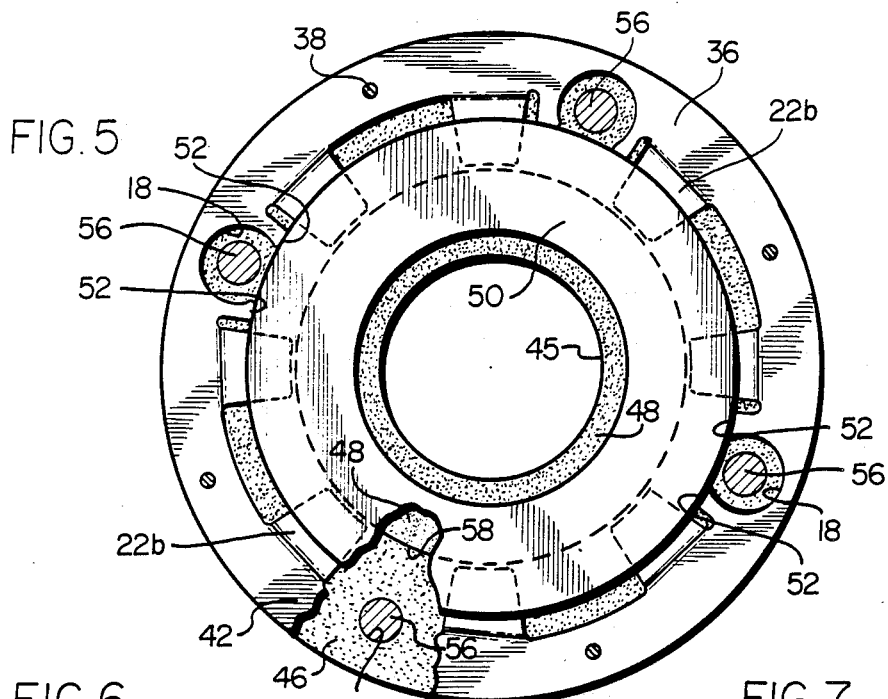
FIG. 5 is a sectional view taken along section line 5—5 of FIG. 4.

Spring fingers 22a and 22b have a rounded index end 40 to slidingly engage with respective flange surfaces 42. Reference may be made for instance to FIG. 4 wherein there is illustrated pipeline components 44 having respective flanges 46 including flange surfaces 42 and opposing raised face flange surfaces 48. Boltholes 49 (see FIG. 5) are provided through flange surfaces 42 of each flange 46. Attached plate rings 12 and 36 are placed between flanges 46 and with rounded index ends 40 of fingers 22a, 22b slidingly engaging flange surfaces 42. A sealing gasket 50 is loosely captured between plate rings 12, 36 and maintained in position by means of opposing fingers 22a, 22b and guide sections 52 which extend slightly beyond the diameter of boltholes 18 in each of the plate-like rings 12, 36.

Figure 2:
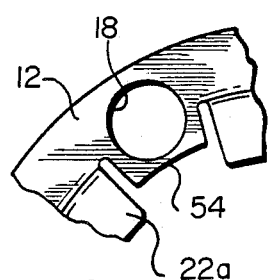
FIG. 2 is a fragmented view of a second embodiment of the invention.

FIG. 1 illustrates one embodiment of the invention wherein the plate is completely cutout with boltholes 18 so that guide portions 52 are in the shape of peninsulas extending beyond the diameter of hole 18. Reference may be made to FIG. 2 wherein there is illustrated another embodiment of the invention in which rather than peninsulas, the guide portions 52 are connected together to form a single guide portion 54. As shown most clearly in FIG. 5, the guide portions 52 (or alternatively 54) on plate rings 12, 36 maintain sealing gasket 50 from encroaching into the areas of holes 18. This enables the throughbolts 56 to be inserted through the opposing flanges 46 and through the plate-like rings 12, 36 without interference from the sealing gasket.

Figures 6, 7:
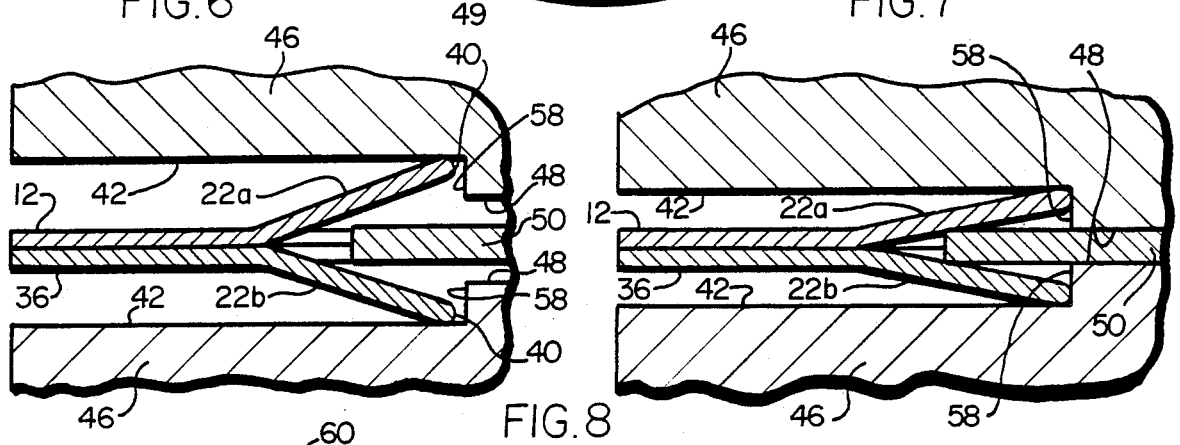
FIG. 6 is an enlarged fragmentary view of the alignment tool in an initial open flange position.
FIG. 7 is an enlarged fragmentary view of the alignment tool in the final closed flange position.

Reference may be made to FIGS. 6 and 7 wherein there is illustrated the mounting of the raised face flanges to each other with the alignment tool in position. In FIG. 6, with flanges 46 slightly separated and alignment tool 10 in position, throughbolts 56 may then be inserted through boltholes 49 in flanges 46 and boltholes 18 in alignment tool 10. Rounded index ends 40 of fingers 22a, 22b are in contact with flange surface 42 and immediately adjacent the raised face surface 48. As the throughbolts are tightened in position to move the flange surfaces 42 and raised face flange surfaces 48 closer together, the spring fingers and rounded index ends abut against shoulder 58 at the outside diameter of the raised face flange so as to prevent relative sideways movement between the pipeline components.

Thus, with continued bolt tightening while flange positioning is maintained by alignment tool 10, the final locked position of FIG. 7 is reached with the respective raised face flange outer diameters (see shoulders 58) maintained in alignment. This of course insures that the centerline of pipeline components 44 are aligned in position to prevent any undesired disruption of fluid flow between the components. It is understood of course that the gasket 50 includes a central aperture which is slightly larger than the aperture of the pipeline components as shown most clearly in FIG. 4.

Figure 8:
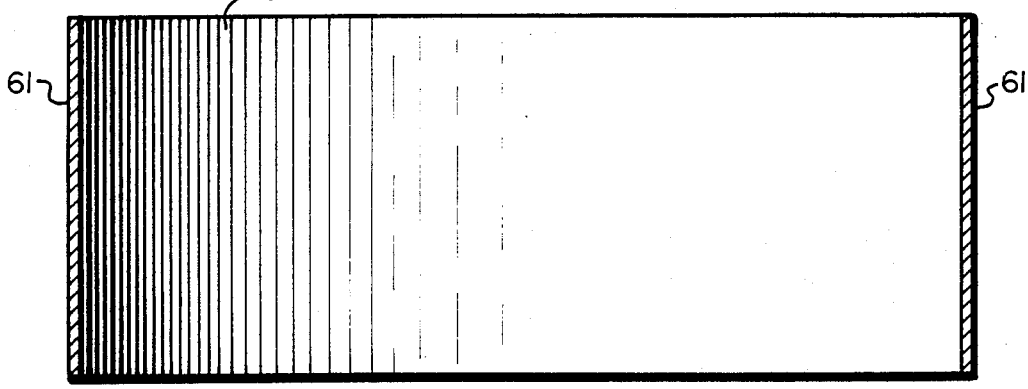
FIG. 8 is a sectional view of a tube for illustrating another technique useful for forming another embodiment of the alignment tool in accordance with the invention.
Figure 9:
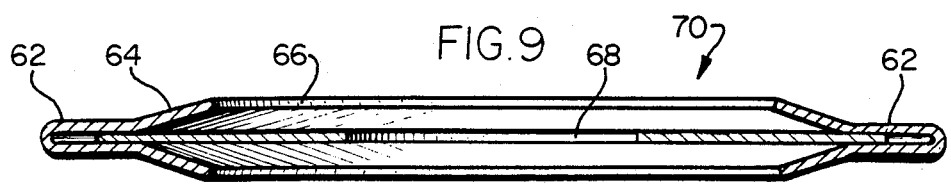
FIG. 9 is a sectional view of an alignment tool embodiment formed from the initial tube of FIG. 8.

Rather than forming alignment tool device 10 with two separate plate-like rings 12, 36, the combined plate-like ring may be formed from a single component. Reference may be made to FIGS. 8 and 9, for instance, wherein there is illustrated a tubular metal member 60 which can be formed to the position shown in FIG. 9. In particular, the tube sections above and below the midpoints of wall 61 can be moved towards each other to form flat-like annular portions 62 with outwardly diverging portions 64 defining an inner diameter 66 which is less than the original diameter of tube 60. A sealing gasket 68 may be initially mounted in position in tube 60 prior to the forming operation so as to be captured between the formed flat-like annular portions 62.

Accordingly, the alternative alignment tool 70 shown in FIG. 9 can be utilized in the same manner as alignment tool 10.

The foregoing detailed description has been given for clearness of understanding only, and no unnecessary limitations should be understood therefrom, as modifications will be obvious to those skilled in the art.

What is claimed is:

1. For use with a pipeline mounting flange having a raised face flange, an alignment device for self centering two opposing raised face flanges during a fluid pipeline mounting operation in which flange throughbolts pass through respective boltholes in the pipeline mounting flanges and the throughbolts are tightened to move the opposing raised face flanges into a locked mounting position, said alignment device comprising:

a plate with a central aperture sufficient to surround said opposing raised face flanges and having an outer portion and an inner portion defining said central aperture;

the plate outer portion including plate boltholes matching the respective boltholes of the pipeline mounting flanges to position said raised face flanges in opposing alignment;

the plate inner portion including raised spring fingers diverging outwardly from the plate surface and located at opposite positions of said central aperture immediately adjacent said opposing raised face flanges;

said opposite raised spring fingers having an inner diameter slightly larger than the outside diameter of said opposing raised face flanges so that as the throughbolts are tightened the opposing raised face flanges engage said spring fingers and maintain said raised face flanges in alignment and enable self centering alignment during said fluid pipeline mounting operation.

2. An alignment device according to claim 1, wherein the inner diameter of said opposite raised spring fingers is dimensioned with respect to the outside diameter of said raised face flange to enable said spring fingers inner diameter to substantially equal the outside diameter of said raised face flange when the opposing raised face flanges are in said locked mounting position.

3. An alignment device according to claim 1, wherein said plate is formed of first and second plate sections mounted together.

4. An alignment device according to claim 3, wherein said first and second plate sections each includes said raised spring fingers.

5. An alignment device according to claim 4, wherein said first and second plate sections are mounted together with the respective raised spring fingers opposing and diverging outwardly away from each other.

6. For use with a pipeline mounting flange having a raised face flange, an alignment device for self centering two opposing raised face flanges during a fluid pipeline mounting operation in which flange throughbolts pass through respective boltholes in the pipeline mounting flanges and the throughbolts are tightened to move the opposing raised face flanges into a locked mounting position, said alignment device comprising:

a plate with a central aperture sufficient to surround said opposing raised face flanges and having an outer portion and an inner portion defining said central aperture;

the plate outer portion including plate boltholes matching the respective boltholes of the pipeline mounting flanges;

the plate inner portion including raised spring fingers diverging outwardly form the plate surface and located at opposite positions of said central aperture immediately adjacent said opposing raise face flanges;

guide sections extending outwardly from the plate inner portion to an extent slightly beyond said pipeline mounting flange boltholes, and a flange seal gasket captured between said raised spring fingers and said guide sections so as to be clear of said flange boltholes and to be aligned with said raised face flange; and said opposite raised spring fingers having an inner diameter slightly larger than the outside diameter of said opposing raised face flanges so that as the throughbolts are tightened the opposing raised face flanges engage said spring fingers and maintain said raised face flanges in self centering alignment during said fluid pipeline mounting operation.

7. An alignment device according to claim 6, wherein at least two guide sections are provided for two respective plate boltholes, and wherein each guide section surrounds a respective plate bolthole.

* * * * *